UNITED STATES PATENT OFFICE.

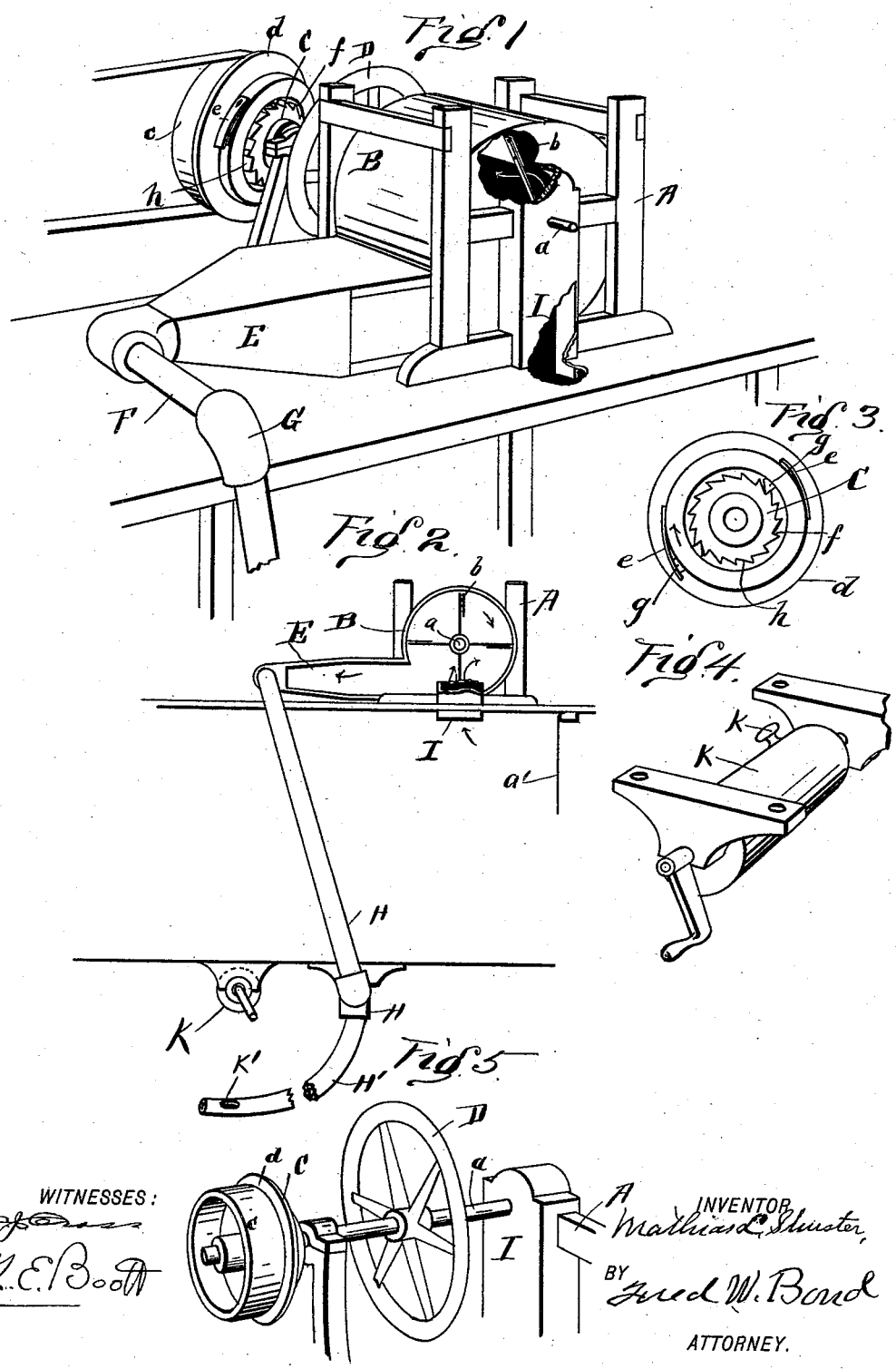

MATHIAS L. SHUSTER, OF MINERAL POINT, OHIO, ASSIGNOR OF ONE-HALF TO IRA B. SHUSTER, OF SAME PLACE.

DUST-CONVEYER FOR THRASHING-MACHINES.

SPECIFICATION forming part of Letters Patent No. 531,280, dated December 18, 1894.

Application filed August 23, 1894. Serial No. 521,085. (No model.)

*To all whom it may concern:*

Be it known that I, MATHIAS L. SHUSTER, a citizen of the United States, residing at Mineral Point, in the county of Tuscarawas and State of Ohio, have invented certain new and useful Improvements in Dust-Conveyers for Thrashing-Machines; and I do hereby declare that the following is a full, clear, and exact description of the same, reference being had to the annexed drawings, making a part of this specification, and to the letters of reference marked thereon, in which—

Figure 1, is a perspective view, showing the collector placed upon the top of a thrashing machine to proper position for use and illustrating portions broken away. Fig. 2, is a transverse section of the fan, showing the location of the dust conveying pipes. Fig. 3, is a view, showing the arrangement of the ratchet pulley and ratchet, together with their different parts. Fig. 4, is a detached view of the hose winding drum or cylinder. Fig. 5, is a view of the fan shaft together with the different parts belonging thereto.

The present invention has relation to dust collectors for thrashing machines, and it consists in the different parts and combination of parts, hereinafter described and particularly pointed out in the claim.

Similar letters of reference indicate corresponding parts in all of the figures of the drawings.

In the accompanying drawings A, represents the fan-supporting frame, which may be constructed substantially as shown, or it may be differently constructed, as the only object to be accomplished is to properly support the fan shaft $a$ and the different parts belonging to the frame and shaft.

To the fan-shaft $a$ is securely attached in the ordinary manner the fan blade $b$, which blade is located within the casing B. The frame A, together with all of its different parts is located upon the top of the thrashing machine substantially as illustrated in Fig. 1. To the fan-shaft $a$ is securely attached the ratchet wheel C, and the balance wheel D.

Upon the fan-shaft $a$ is loosely mounted the pulley $c$, which pulley may be provided with the belt flange $d$. The pulley $c$ is also provided with the springs $e$, which springs are preferably located as illustrated in Fig. 3, and as shown one end of each of the springs is securely attached to the pulley $c$. The pulley $c$ is provided upon its inner face with the recess $f$, within which recess is located the ratchet wheel C.

To the pulley $c$ are loosely attached the pawls $g$, the outer ends of which are located directly opposite the free ends of the springs $e$. The object and purpose of the springs $e$, is to normally hold the inner ends of the pawls or detents $g$ in contact with the teeth of the ratchet wheel C, which teeth are provided with the inclined faces $h$, which inclined faces are for the purpose hereinafter described.

To one side of the casing B, is located the conduit E, to the end of which conduit is attached the pipe F, which pipe is formed in sections and the sections properly attached together by means of suitable elbows, such as G or their equivalent.

To the vertical pipe H, is attached the hose H' which may be of any desired length or size, and is to be located so as to convey the dust to any desired point. The exit of the vertical pipe H is preferably located below the machine proper, but this is not absolutely necessary inasmuch as the same object can be accomplished by rotating the pipe H at other points.

To the sides of the frame A, are attached the conduits I, which conduits extend through the top of the machine proper, thereby communicating with the interior of a thrashing machine. In the drawings but one conduit I is illustrated, but it will be understood that there is to be one conduit upon each side of the frame, which conduits communicate or lead into the fan chamber.

It will be understood that to provide for the successful operation of the dust collector proper, nearly a uniform motion of the fan should be maintained, and inasmuch as the speed of a thrashing machine is frequently lowered for a short time by heavy feeding, the balance wheel D is provided the momentum of which will keep up the speed of the fan during the time the speed of the thrashing machine is lowered.

For the purpose of allowing for the differences of motion between the ratchet wheel C, and the pulley c, during the time the fan is carried by the momentum of the balance wheel D, the springs e, and the pawls or detents g, are provided; the ratchet wheel C being permitted to move forward or faster than the pulley c, by reason of the inclined faces h passing the inclined ends of the detents g.

For the purpose of providing a means for properly packing the flexible hose H' during the time the thrashing machine is conveyed from place to place the cylinder or drum K, is provided; which cylinder or drum is properly journaled to the bottom or under side of the thrashing machine proper, and as shown, said cylinder or drum is provided with the button or stud k, which button or stud is for the purpose of providing a means for attaching the hose to the cylinder by means of button hole k'.

It will be understood that in use the dust collector proper is to be placed about midway of the thrashing machine and back of the thrashing machine cylinder. In the drawings the construction of the thrashing machine is omitted, inasmuch as the thrashing machine forms no particular part of the present invention, except that it is to be used in connection with a thrashing machine of any desired kind or style.

For the purpose of preventing the dust from escaping, to the rear end of the thrashing machine, an apron is to be located a short distance back of the conduit I.

In Fig. 2, the apron a' is illustrated placed in proper position, and may be formed of any suitable flexible material.

Having fully described my invention, what I claim as new, and desire to secure by Letters Patent, is—

The combination of the frame A, provided with the casing B, having a fan located therein, the conduits I, leading from the interior of the thrashing machine to the fan chamber, the conduit E, the pipes F, the hose H' and the cylinder or drum K, provided with the button or stud k, and means for attaching the hose to the button or stud, substantially as and for the purpose specified.

In testimony that I claim the above I have hereunto subscribed my name in the presence of two witnesses.

MATHIAS L. SHUSTER.

Witnesses:
R. E. HAVERMAN,
W. M. TRACY.